Nov. 3, 1964     J. L. FRENCH ETAL     3,155,250
EARTH WORKING IMPLEMENT Filed Sept. 10, 1958     4 Sheets-Sheet 1

INVENTORS
J. L. FRENCH
A. J. VAN AUWELAER
D. C. AGER

ATTORNEYS

Nov. 3, 1964  J. L. FRENCH ETAL  3,155,250
EARTH WORKING IMPLEMENT

Filed Sept. 10, 1958  4 Sheets-Sheet 4

INVENTORS
J. L. FRENCH
A. J. VAN AUWELAER
D. C. AGER
BY
ATTORNEYS

United States Patent Office 3,155,250
Patented Nov. 3, 1964

3,155,250
EARTH WORKING IMPLEMENT
John L. French, Moline, and Albert J. Van Auwelaer, East Moline, Ill., and Douglas C. Ager, Muscatine, Iowa, assignors to Deere & Company, Moline, Ill., a corporation of Delaware
Filed Sept. 10, 1958, Ser. No. 760,266
23 Claims. (Cl. 214—138)

This invention relates to an earth working implement adapted for mounting on a mobile vehicle. Still more particularly this invention relates to a type of implement having a boom with earth working equipment at one end and supported on a stand or mounting structure at the opposite end. Particularly, this invention is concerned with the stand and its means of attachment to the boom and the vehicle frame.

In the type of implement generally known in the industry as a backhoe, there is provided conventionally an upright and transverse stand or frame positioned to the rear of a tractor and supported either on the tractor by suspension or in conjunction with legs on the frame which are retractible for transport purposes and which offer stability when the implement is in operation. A boom is mounted on the transverse stand by various types of connecting frame work which generally include a post or other type of mechanism permitting swiveling or swinging of the boom about its connection point. On the outer end of the boom there is provided earth working equipment which includes a dipper stick pivoted for vertical movement on the boom and which carries on its remote end a bucket which serves to both dig the earth and to transport the earth that has been dug. Suitable hydraulic means are provided for both moving the dipper stick relative to the boom and for moving the boom vertically.

While generally it is advantageous for stability purposes to mount the boom centrally relative to the transverse upright stand or frame, there are various conditions which arise due to terrain and obstacles, such as buildings, trees, and other permanent installations, in which it is desirable to mount the boom at one end of the transverse frame as well as intermediate the ends. In the now generally accepted manner of providing for such, there is provided a mounting saddle at the ends of the transverse frame as well as the center and the backhoe implement may be removed from the transverse frame and relocated at any of the center or end positions. However, since there is considerable weight involved in this type of earth moving equipment, the time consumed to remove the backhoe structure and to replace it at a different position has been considerable and has, of course, caused shut-down time on the implement as well as expense in labor of removing and replacing the backhoe structure. Also, normally the repositioning of the backhoe is a shop operation and cannot be done on the job.

It is therefore the primary object of this invention to incorporate in the transverse frame at the rear of the tractor, transverse track means and cooperating guide means on the mounting structure of the backhoe which permits the backhoe to be mounted on the track means in any transverse position. In one form of the invention, there is provided a series of transversely spaced holes on the track means which receive bolts for locking the backhoe in a fixed position. In a second form of the invention there is provided on the backhoe mounting structure, a locking mechanism independent of the track means which will lock the backhoe mounting structure in any position along the track means.

In providing track means for mounting the backhoe mounting structure, the hydraulic units on the backhoe bucket or dipper stick structure may be used to effect movement of the backhoe along the track means. By merely loosening or releasing the locking means connecting the backhoe mounting structure and transverse frame, and by swinging the boom to a side position the bucket may be placed against a solid object or in the earth and the hydraulic cylinders operated on the backhoe so that the mounting structure is forced along the track to the desired position. The backhoe then may be locked in the new position.

In particular types of backhoe operations there is a desirability of obtaining a high degree of accuracy. For example, in digging a trench between arrow limits, as between underground cables, it might be desirable to fix the boom and backhoe in a fixed fore-and-aft position so as to prevent swiveling action and to adjust the backhoe relative to the frame or stand by transverse movement on the track. As a further example, in digging graves, it is desirable for appearance sake to make a trench or grave with smooth sides. Again, it is desirable to move the backhoe or its supporting structure relative to the transverse stand rather than to swing the boom with each digging operation. Consequently, as a further modification and improvement on the above described type of track mounting, it is proposed to provide a hydraulic cylinder between the transverse frame and the backhoe supporting framework which may be accurately controlled and which will move the supporting framework of the backhoe along the tracks in a reciprocating manner so that the trench built by the backhoe may be accurately dug and have relatively smooth sides.

There exists in many instances conditions in operating a backhoe in which for various reasons the tractor must be positioned a considerable distance from the location of the digging. In the above example of digging graves, there will in many instances arise a condition in which the tractor must be positioned to avoid other graves and markers. Also, in operating around soft and filled earth, the weight of the tractor will, in many instances, cause collapse of the trench. It is therefore also proposed and is an object of the present invention to provide track means on the forward surface of the transverse frame which permits the frame itself to be moved transversely relative to the tractor. The movement of the transverse frame will of course operate in conjunction with retractible and extensible legs which may be raised to permit easy transverse movement and may be lowered to offer support and stability for the transverse frame. Again, the transverse frame may be moved by sliding on its tracks either by means of the hydraulic units on the backhoe or a separate hydraulic unit between the tractor frame and the transverse frame.

Other objects and advantages of the invention will become apparent to those skilled in the art as the nature of the invention is better understood from the following specification and accompanying drawings.

The earth working implement or backhoe 10 is of the type normally mounted on the rear of a tractor 11 or other type of mobile vehicle. The tractor 11 includes a main power unit or engine, not shown, and a body 12 supported on front wheels, also not shown, a pair of rear traction wheels 13, 14. An operator's station 15 is provided on the tractor and includes therein a seat which is reversible and which may be moved into position to either drive the tractor or to operate the controls, as indicated by the levers 16, for operating the backhoe 10.

The backhoe 10 includes a vertically adjustable boom or mast structure 20 which is supported on a rotary type post at its forward end, the rotary type post being in the form of a rotary type hydraulic cylinder 21 which permits the boom 20 and the associated parts of the backhoe 10 to swing laterally about the forward end of the boom 20. Suitable ear brackets 22, 23 extend rearwardly from the cylinder 21 and form connecting links for the boom 20 and a hydraulic cylinder 24 respectively, the latter being the controlling element for raising or lowering the boom or mast structure 20. The backhoe 10 also includes a load carrying device in the form of a dipper stick 25 pivoted at 26 to the outer end of the boom 20. The dipper stick and its load carrier or bucket 31 is swung vertically about the pivot 26 by means of a hydraulic cylinder 27. Pivotally supported at 30 on the outer end of the dipper stick 25 is the carrier or bucket 31 controlled by a hydraulic cylinder 32 which connects to the bucket 31 by means of a linkage 33. Up to this point description of the backhoe is limited and only generally described, all features and characteristics of such being more or less conventional and well known within the art. Mounted on the tractor 11 is supporting framework 40 on which is mounted the implement supporting frame or stabilizing stand indicated in its entirety by the reference numeral 41 which serves basically as the attachment means between the backhoe implement and tractor 11. The exact nature of the supporting frame 40 is unimportant for purposes of the present invention and consequently details are not here presented. The stabilizing stand 41 is mounted on the supporting frame 40 by means of an inverted U-shaped saddle which fits over the upper surface and extends downwardly on opposite sides of the supporting frame 40. Bolts, such as at 43, lock the saddle bracket 42 rigidly on the supporting frame 40.

Figure 1:
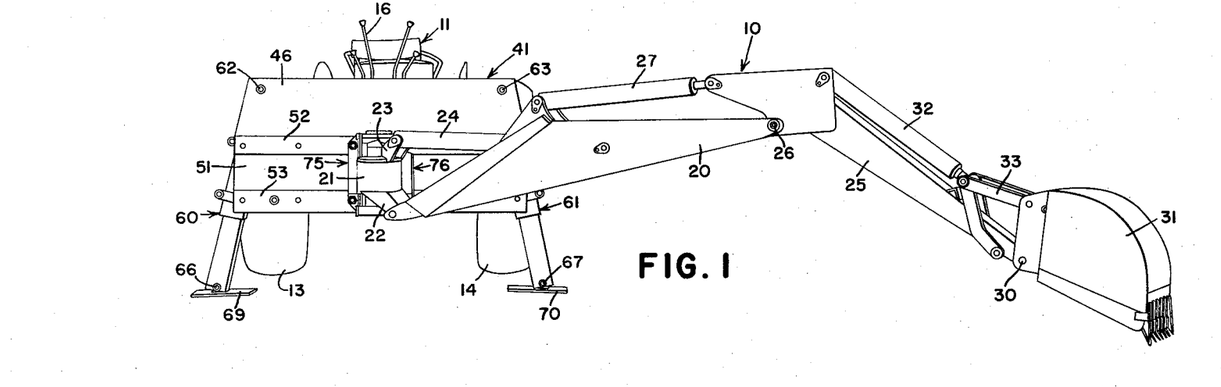
FIG. 1 is a perspective view taken from the rear of the tractor and the backhoe.
Figure 2:
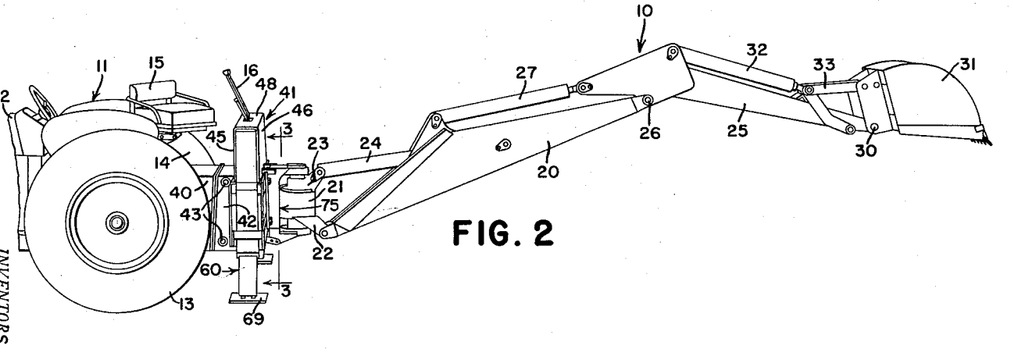
FIG. 2 is a side perspective view of the rear portion of the tractor and the backhoe.
Figure 3:
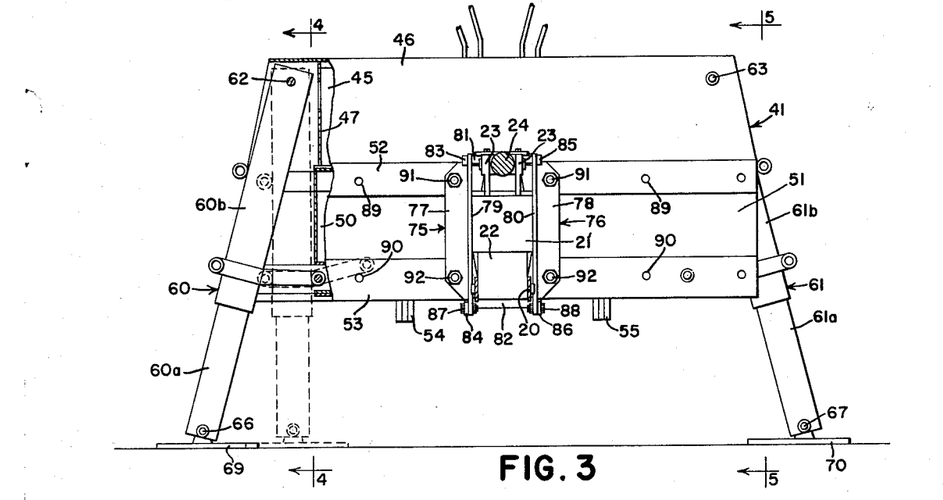
FIG. 3 is an enlarged sectional view of the backhoe structure taken substantially along the line 3—3 of FIG. 2 and showing parts thereof removed.
Figure 4:
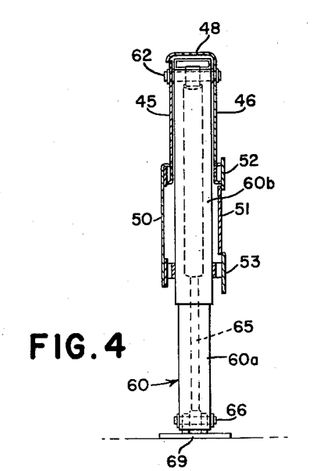
FIG. 4 is a sectional view taken substantially along the line 4—4 of FIG. 3.

The stabilizing stand includes therein fore-and-aft spaced apart and upright plate members 45, 46 having suitable web-type bracing, as at 47, rigidly connected to opposed walls of the plates 45, 46 and forming a rigid frame structure. The rear plate 46 has a forwardly extending and horizontal upper portion 48 which extends over the upper edge of the front plate 45 and closes the upper end of the stand 41. As may be seen from FIG. 3, the webbing 47 is positioned inwardly of the outer ends of the plate members 45, 46 so as to form slots opening outwardly at opposite ends of the stand 41. Positioned below the front and rear upright plate portions 45, 46 are lower upright plate portions 50, 51 respectively. The plate portion 51 supports from its rear surface and its upper and lower edges respectively upper and lower transverse tracks or rails 52, 53 respectively. The rails 52, 53 extend the entire width of the stabilizing stands and, as will later become apparent, serve as tracks on which the rotary cylinder and the associated backhoe may move transversely relative to the stand. The exact manner of supporting the tracks on the stabilizing stand will not be described in detail, although from viewing FIGS. 3 and 4, it should be recognized that both suitable cross bracing and webbing 47 is provided to rigidly mount the rolls or tracks 52, 53 on the stand.

Figure 5:
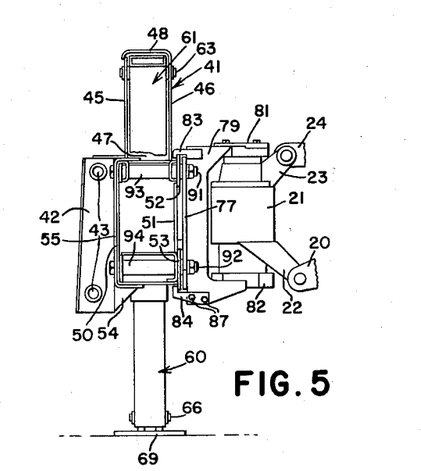
FIG. 5 is a sectional view taken substantially along the line 5—5 of FIG. 3.

The front plate 50 provides the basic connection between the frame 40 and the stabilizing stand. As may be seen from FIG. 5, the U-shaped saddle 42 is provided with a rearwardly extending U-shaped member 55 which overlies the plate portion 50 and is rigidly held by welding, which is not shown, to the front surface of the plate portion 50. Truss members 54, extend from the rear edge of the legs of the saddle member 42 rearwardly and upwardly to support the lower surface of the member 55. Again it should be recognized that all portions of the stabilizing stand, other than those specifically noted to be otherwise, are rigidly held together by welding, webbing, and other rigid means so as to structurally supply adequate support for the backhoe.

As mentioned previously, the webbing 47 between the plates 45, 50 and 46, 51 is spaced from the ends of the stabilizing stand so as to permit stabilizing legs 60, 61 to be inserted in the recessed areas of the stabilizing stand. The legs 60, 61 are pivoted at their upper ends on pins 62, 63 respectively to swing between a relatively vertically disposed position laterally to an inclined position. As may be seen in FIG. 3, the legs 60, 61 may be recessed between the front and rear plate structures 45, 50 and 46, 51 when in their upright positions. The legs 60, 61 are characterized by being composed of telescoping sections 60a, 60b and 61a, 61b which are controlled for extension and retraction by means of hydraulic cylinders, as shown in dotted representation in FIG. 4 as at 65. The upper ends of the cylinders 65 are mounted on the upper pivot pins 62, 63 and are connected at their lower ends to pivot pins 66, 67 on which is further mounted a pair of pads 69, 70 respectively. The pads 69, 70 are for obvious purposes of preventing the legs 60, 61 from digging into the earth when weight is applied on them.

The rotary type cylinder 21 is mounted on the stabilizing stand 41 by means of structure including a pair of transversely spaced apart angle iron members 75, 76 having vertically disposed flanges 77, 78 lying adjacent to the track members 52, 53 and rearwardly extending flanges 79, 80. Supported between the rearwardly extending flanges 79, 80 are upper and lower cylinder supports 81, 82 respectively which support the cylinder 21 therebetween. The flanges 79, 80 have fixed thereto hook or guide members 83, 84, 85, and 86 which have forwardly extending hook ends which extend over or are complementary to the track members 52, 53 so as to permit, unless otherwise restricted, transverse movement of the entire boom structure including the rotary cylinder 21 relative to the stabilizing stand and tractor. Upper hook members 83, 85 are welded to the flanges 79, 80 respectively whereas the lower hook members 84, 86 are bolted, as at 87, 88 to the flanges 79, 80, the latter detachable connection being for purposes of removing the entire cylinder and backhoe from the stabilizing stand. The tracks 52, 53 have transversely spaced bores 89, 90 for receiving bolts 91, 92. Spacers 93, 94 are mounted on the bolts 91, 92. The flanges 77, 78 are also provided with openings, not shown but clearly apparent, which are registrable with the openings 89, 90, and receive the bolts 91, 92. It will be noted that the bores 89, 90 are spaced apart transversely on the order of the angle iron members 75, 76 so that any adjacent pair of bores may be used for locking or bolting the angle iron members 75, 76 thereto. Therefore, it is apparent that the support for the rotary cylinder 21 may be positioned in any of a number of transverse positions on the track members 52, 53.

Figure 6:
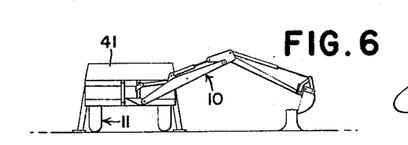
FIG. 6 is a schematic view of the tractor and backhoe in operation.

It is particularly desired to emphasize the manner in which the rotary cylinder support may be moved on the tracks 52, 53. By comparison, past methods of repositioning the backhoe on the stabilizing structure has consisted of unbolting the supporting structure of the backhoe and completely removing the structure and backhoe from the stabilizing stand and replacing the supporting structure at a fixed position on the stabilizing stand. FIG. 6 emphasizes the simplicity of repositioning the present supporting structure on the stabilizing stand. By removing the bolts 91, 92 the supporting structure is free to move on the tracks 52, 53. By operating the rotary cylinder 21 so that the boom structure and backhoe in general is positioned transverse to the longitudinal dimension of the tractor, the hydraulic cylinders of the boom, dipper stick, and bucket may be utilized to move the supporting structure along the track members 52, 53. For example, as shown in FIG. 6, the bucket may engage a stump of a tree and by operating any of the aforementioned cylinders, the supporting structure may be driven hydraulically along the track. Once the supporting structure is positioned along the track in the desired position, the bolts 91, 92 may then be inserted in the proper set of bores 89, 90 and the backhoe and its supporting structure fixed in the desired position. It should also be recognized that while the particular method of moving the backhoe has been shown as basing against a tree stump, other methods may be used for moving the supporting structure such as inserting the bucket end into the ground or any other relatively immovable object and then dragging the supporting structure along the tracks.

In the form of invention shown in FIGS. 7-10, there is therein provided a system or mechanism in which the backhoe supporting structure may be moved transversely along the tracks and locked in any desired position on those tracks. There is provision for tracks on the front and rear surfaces of the supporting stand so that the backhoe or boom structure may be mounted either on the forward or rear surface of the supporting stand. A further provision is for the saddle member connecting the stand to the frame on the tractor to also have hook or guide members permitting the frame itself to move transversely relative to the tractor.

Figures 7, 8, 9, 10:
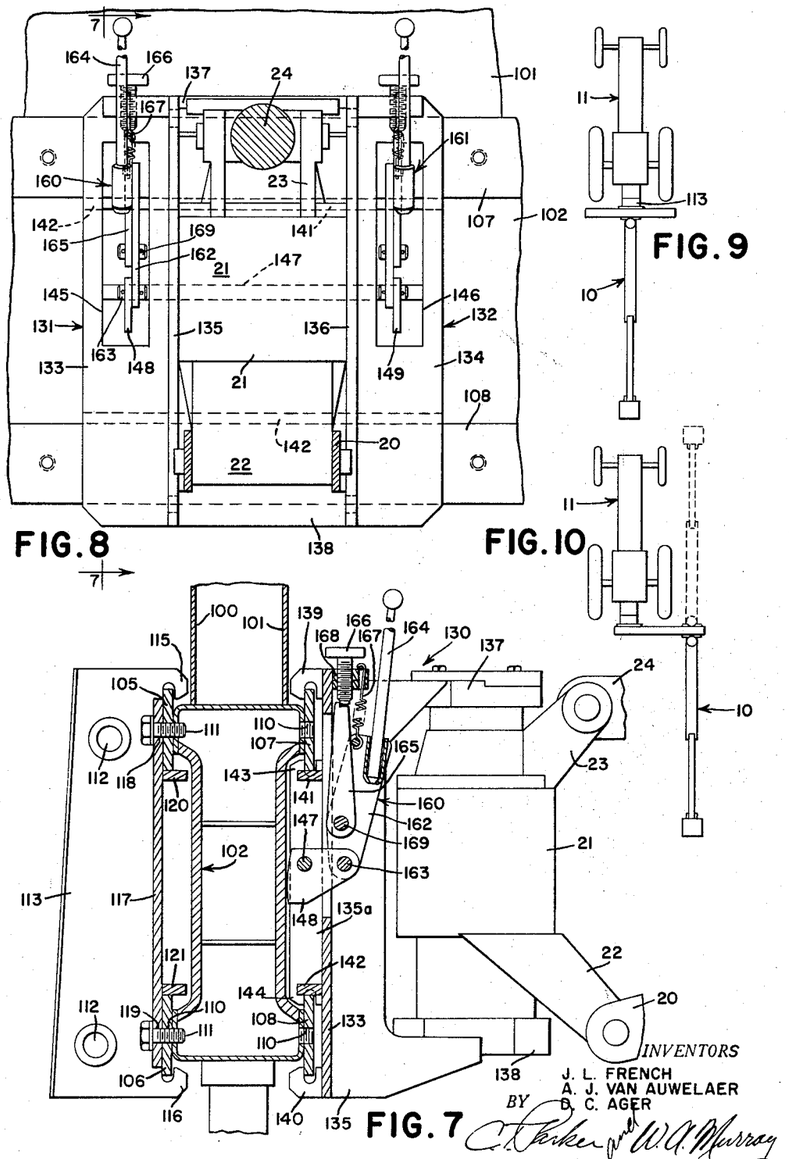
FIG. 7 is a sectional view of the mounting structure and transverse frame of the backhoe showing a modification of the invention taken along the line 7—7 of FIG. 8.
FIG. 8 is a rear view partially in section of the mounting mechanism for the backhoe.
FIGS. 9 and 10 are schematic plan views of the backhoe and tractor showing two different positions of the backhoe relative to the tractor as would be permissible in the modification shown in FIGS. 7, 8.

The stabilizing stand is composed of upper front and rear upright panels 100, 101 similar in detail to the wall structures 45, 46 previously described. The lower portion of the stabilizing stand is composed of upright structure having an I-shaped cross section 102, with the upper and lower bars of the I having rigidly fixed thereto upper and lower transverse rails 105, 106 on the front or facing the tractor and upper and lower transverse rails 107, 108 on the rear or facing the boom structure. The rails 105-108 are provided with suitable tapped bores, as at 110 for receiving bolts 111, the purpose of which will later be explained. The structure for mounting the supporting stand on the tractor frame 40 includes a U-shaped saddle 113 similar in cross section to that described in the previous form of the invention as reference numeral 42, which fits over the frame 40 and is pinned, as at 112, to the frame 40. The saddle 113 has depending leg portions with hooks or guides, as at 115, 116 which fit behind the upper and lower tracks 105, 106 and serve as transverse guide means for the tracks 105, 106 and the entire implement supporting frame or stand 41. Interconnecting the opposite legs of the saddle 113 is in upright transverse plate 117 having upper and lower openings 118, 119 respectively which receive the aforementioned bolts 111. Since the tapped bores 110 are transversely spaced across the tracks 107, 108, transverse movement of the supporting stand may be permitted by removing the bolts 118, 119 and to support the supporting stand on the hooks 115, 116. Guide plates 120, 121 extend rearwardly from the rear face of the upright plate 117 and serves as guides for the lower edge of the track 105 and for the upper edge of the track 106 respectively. The leg sections of the stabilizing stand shown in FIGS. 7 and 8 are also of the extensible and retractible type and consequently by raising the legs so as to clear the ground, the stabilizing stand or implement supporting frame may then be suspended on the tractor frame by means of the hooks 115, 116 Upon the bolts 118, 119 being removed, the entire stabilizing stand may be moved transversely by use of the cylinders on the backhoe in a manner similar to that previously described for moving the backhoe on the stand. Specifically, by locking the backhoe against transverse movement relative to the stabilizing stand, and by extending the backhoe to one side of the tractor and engaging a rather rigid object, the stabilizing stand may be moved relative to the tractor. A position of the stand created by such a movement is shown in FIG. 10 which shows the tractor connected to one end of the stabilizing stand. Upon the stabilizing stand being positioned transversely to the desired location, the bolts 118, 119 may be fitted into the alined tapped bore 110 and the stand locked in the desired position.

Supporting structure 140 for mounting the backhoe rotary cylinder 21 on the stabilizing stand is provided on the rear surface of the stand. The structure 130 includes therein a pair of upright angle iron members 131, 132 having transverse and outwardly extending flanges 133, 134 lying substantially adjacent the track members 107, 108 and rearwardly extending upright flanges 135, 136 positioned on opposite sides of the rotary cylinder 21. Extending between the flanges 135, 136 are transverse and laterally disposed bracing members 137, 138 which support from above and below the rotary cylinder 21.

Hook or guide members 139, 140 extend forwardly from the flanges and hook forwardly of the upper edge of the track 107 and the lower edge of the track 108 respectively. Rigid with the rear surface of the flanges 133, 134 are forwardly extending guide plates 141, 142 which ride against the lower edge of the track 107 and the upper edge of the track 108 respectively. It appears obvious in view of the previous explanations, that unless otherwise restricted the backhoe supporting structure 130 will move freely on the tracks 107, 108.

Provided on the flanges 133, 134 are upright slots 145, 146 receiving locking linkages presently to be described. Forward extensions, only one being shown at 135a, of the flanges 135, 136 extend forwardly of the transverse flanges 133, 134 and are terminated adjacent the web of the I-shaped structure 102. The extensions support transverse pivot pin 147, on which are mounted cam plates 148, 149.

The cam plates 148, 149 are provided with rear cam edges which engage the flange portion of the I-shaped structure 102. By pivoting the cam plates 148, 149 about the pivot pins 147, pressure can be applied by the hooks 139, 140, 143 and 144 against the rear surface of the tracks 107, 108. Obviously therefore, the cam plates 148, 149 and the associated control linkage herein to be described, operate as locking means for preventing movement of the supporting structure 130.

Toggle linkages 160, 161 having over-center locking arrangements are provided for rotating the cam plates 148, 149. Toggle linkages 160, 161 operate to rotate the cam members 148, 149 about the shaft 147. Since the linkages are identical, description shall be limited to the left toggle linkage 160. The linkage 160 includes therein a primary link 162 which is pivotally connected at its lower end by the pin 163 to the cam plate 148. The upper end of the link 162 is provided with a control lever 164. Pivotally connected by pivot pin 169 to a midportion of the link 162 is an upwardly extending control link 165, the upper end of which is stepped and inserted under an adjustment screw 166. A biasing spring 167 extends between the bracket 168 supporting the adjustment screw and the upper end of the primary link 162.

In operation, the toggle linkage 160 operates in the following manner. Assuming the cam member 147 is in a locking position as shown in FIG. 7, the cam plate 148 may be released by moving the lever 164 in a clockwise direction. This will cause the pivot pin 169 to swing in a clockwise direction and the spring 167 will operate to retain the link 165 against the set screw 166. This will cause the pivot pin 163 connecting the primary link 162 and cam plate 148 to swing in a counterclockwise direction and to cause the cam member 147 to swing in a counterclockwise direction thereby causing the cam to become disengaged with the I-shaped structure 102. For locking the cam member, the lever 164 is moved in a counterclockwise direction and the obvious reversal of movement in the mechanism will occur which will cause the cam member 147 to again lock the backhoe supporting structure 130 against transverse movement. It will be noted from viewing FIG. 7 that the three points of pivot created by the pivot pin 163, 169 and the upper end of the link 165 provides an over-center locking arrangement when the lever 164 is in its maximum counterclockwise position. The degree of pressure affected by the lever 164 and cam member 148 may be adjusted by turning the adjusting shoe 166.

Reviewing FIGS. 7–10 as a whole, it is apparent that the backhoe supporting structure 130 may be moved transversely on the tracks 107, 108 by releasing the cam section and operating the hydraulic cylinders on the backhoe in the manner shown in FIG. 6 as described in the previous form of the invention. By providing the arrangement of tracks as shown in FIGS. 7–10, i.e., tracks on both the front and rear face of the stabilizing stand, the backhoe supporting or boom structure may be mounted on either the front or rear face of the stabilizing stand. Also by providing the tracks 105, 106 on the front face of the stabilizing stand and by further providing the track engaging hooks 115, 116 on the saddle support 113, the stabilizing stand itself may be moved transversely by raising the leg members of the stand and drawing the stand transversely across the rear portion of the tractor. The stand may be rigidly held in a desired position by inserting the bolts 111 in the respective tapped bores 110. Consequently, one end of the stabilizing stand may be the connecting point to the tractor. Again, this extreme position is shown in FIG. 10. FIG. 9 shows generally the position of the stabilizing stand and backhoe in the manner of normally operating the backhoe. However, for special conditions, the backhoe may be adjusted to a maximum position as shown in FIG. 10 and of course in various intermediate positions. It should be recognized that either face of the stabilizing stand may be the mounting face for the saddle support 113 and either face may be the supporting face for the backhoe support 130.

Figure 11:
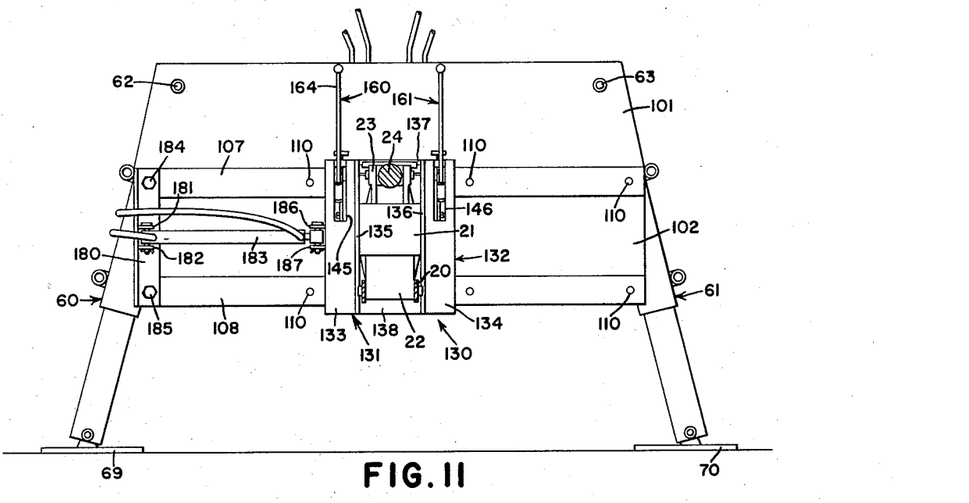
FIG. 11 is a view similar to FIG. 3 showing a further modification of the invention.
Figure 12:
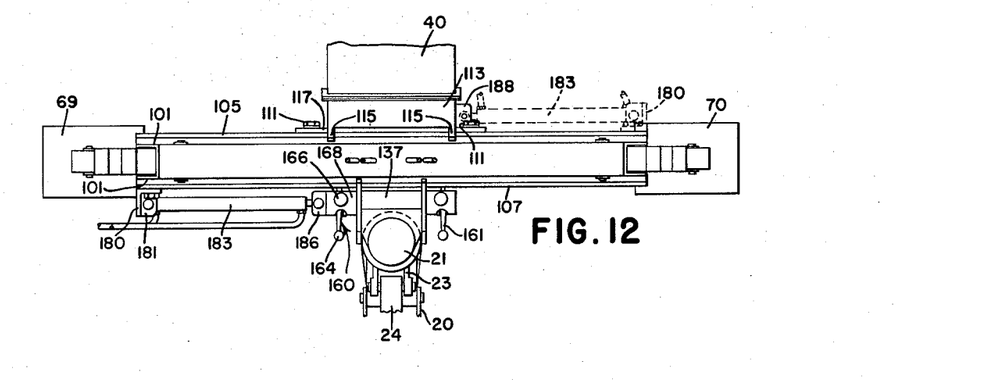
FIG. 12 is a plan view of the modification shown in FIG. 11.
Figure 13:
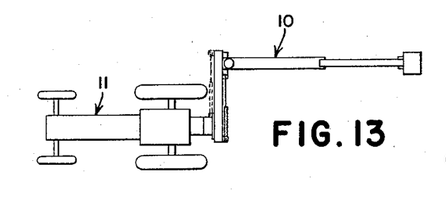
FIG. 13 is a schematic plan view of the tractor and backhoe showing the relative position of the backhoe to the tractor as might occur using the modification shown in FIGS. 11, 12.

In the modification shown in FIGS. 11–13, there is provided a mounting arrangement similar to that shown in FIGS. 7–10 with the exception that there is further provision for a hydraulic cylinder to be directly connected between the stabilizing stand and backhoe supporting structure whereby the backhoe may be adjusted transversely on the tracks by a directly connected cylinder. Since the modified form is identical in most respects to the previous form, similar reference numerals will be given to the identical parts. Supported on the left outer end of the tracks 107, 108 is an angle iron member 180 having an upright flange lying adjacent to the tracks 107, 108 and an upright flange extending rearwardly from the tracks. The latter flange supports a pair of ear brackets 181, 182 which mounts the cylinder end of a hydraulic unit 183. The angle iron member 180 is bolted to the tracks 107, 108 by bolts 184, 185 which are received in the tapped bores 110. Provided on the outer angle iron member 131 of the backhoe supporting structure 130 are a pair of outwardly extending lugs 186, 187 which are spaced apart vertically for receiving the ram end of the hydraulic unit 183. The saddle member 113 also is provided with a pair of vertically spaced apart lugs, only the upper being shown at 188 for receiving one end of a hydraulic unit.

In operation, the form of the invention shown in FIGS. 11–13 is similar to the previous forms with the exception that the hydraulic units on the backhoe are not utilized to move the backhoe supporting structure on the tracks 107, 108. By releasing the latch or locking mechanisms 160, 161 so that the supporting structure 131 is free to move on the tracks, the hydraulic unit 183 may be utilized for such movement. This generally is shown in FIG. 13 which shows the cylinder 183 extended to its maximum position so that the boom or backhoe structure is at one end of the stabilizing stand. Particular value of an arrangement of this nature will occur under conditions in which it is desired to dig a trench substantially wider than the width of the bucket and in which fairly accurate digging must occur. Examples of this might occur in the use of a backhoe for digging a grave or for building a trench between a series of underground pipes or cables. The control of the supporting structure 130 along the tracks 107, 108 may be controlled relatively easily by adjusting the cylinder 183 whereas in many instances the control of the width of the trench by manipulating the boom and dipper stick hydraulic units is difficult and takes a high degree of skill.

As a further use of the hydraulic unit 183, which may be the remote cylinder on the tractor, the cylinder 183 may be moved to the forward face of the stabilizing stand and mounted between the brackets 188 and the angle iron member 180 which may be also supported on the forward facing tracks 105, 106 in a manner similar to its being mounted on the rear tracks 107, 108. This latter position is shown in dotted representation in FIGS. 12 and 13 and the obvious purpose is for moving the stabilizing stand relative to the saddle support 113. Again, the use of the cylinder 183 eliminates the requirement of the use of the hydraulic cylinders on the backhoe for the power source for moving the stabilizing stand.

While only a few forms and modifications of the invention have been shown, it should be recognized that other forms and variations will occur to those skilled in the art. Also, it should be recognized that other relative positions between the backhoe structure, the stabilizing stand, and tractor may exist with the system of transverse adjustments, and that those shown in FIGS. 6, 9, 10 and 13 were for purposes of illustration only. Therefore, it should be understood that the present detailed description of the invention has been shown for the purpose of clearly and concisely illustrating the basic principles of the invention and is not meant to narrow or limit the invention beyond the broad general principles set forth and claimed in appended claims.

What is claimed is:

1. In a combination of implement and vertically disposed supporting stand in which the implement includes a boom structure swingable angularly about one end and has earth working equipment at the opposite end, and the stand includes therein vertically retractible leg supports and is mountable on a forwardly movable vehicle, the improvement residing in: upper and lower transverse track members mounted on the stand and facing the implement; guide elements complementary to the track members mounted on and adjacent said one end of the boom structure, said guide elements being engageable with the track members to permit transverse movement of the boom structure along the track members; upper and lower continuous transverse track members supported on the stand and facing the vehicle; a supporting structure mounted on the vehicle and including therein guide elements complementary to and engageable with the track members facing the vehicle effective to permit transverse movement of the stand relative to the vehicle; means adaptable to lock the boom structure in any of a plurality of transverse positions relative to the stand; means adaptable to lock the stand in any of a plurality of transverse positions relative to the supporting structure; and power means effective to move said implement transversely relative to the stand and along the track members facing the implement and said stand relative to its supporting structure along the track members facing the vehicle to effect positioning of the implement and stand relative to the stand and vehicle respectively.

2. In a combination of implement and vertically disposed supporting stand in which the implement includes a boom structure swingable angularly about one end and has earth working equipment at the opposite end, and the stand includes therein vertically retractible leg supports and is mountable on a forwardly movable vehicle, the improvement residing in: transverse track means mounted on the stand and facing the implement; guide elements complementary to the track means mounted on and adjacent said one end of the boom structure, said guide elements being engageable with the track means to permit transverse movement of the boom structure along the track means; transverse track means supported on the stand and facing the vehicle; a supporting structure mounted on the vehicle and including therein guide elements complementary to and engageable with the track means facing the vehicle effective to permit transverse movement of the stand relative to the vehicle; means adaptable to lock the boom structure in any of a plurality of transverse positions relative to the stand; means adaptable to lock the stand in any of a plurality of transverse positions relative to the supporting structure; and power means effective to move said implement transversely relative to the stand and along the track means facing the implement and said stand relative to its supporting structure along the track means facing the vehicle to effect positioning of the implement and stand relative to the stand and vehicle respectively.

3. The invention defined in claim 2 in which the track means facing the vehicle and the implement are substantially identical and the guide elements on the boom structure and supporting structure will engage either of the track means whereby the implement and vehicle may be positioned on either side of the stand or may be positioned on the same side of the stand.

4. In a combination of implement and vertical disposed supporting stand adaptable for connection to a vehicle in which the implement includes a boom swingable angularly about one end and has earth working equipment at the opposite end, the improvement residing in: transverse structure on the stand facing the implement; structure mounted on and adjacent said one end of the boom, said latter structure being engageable with the transverse structure on the stand so as to permit positioning of the boom in any of a plurality of transverse positions on the transverse structure; a supporting structure mounted on the vehicle and including therein elements engageable with the stand; means mounting the stand on the elements, said means being adapted to permit transverse movement of the stand relative to the vehicle; means adaptable to lock the boom in any of a plurality of transverse positions relative to the stand; means adaptable to lock the stand in any of a plurality of transverse positions relative to the supporting structure; and power means effective to move said implement transversely relative to the stand and said stand transversely relative to its supporting structure to effect transverse positioning of the implement and stand relative to the stand and vehicle respectively.

5. In a combination of implement and vertically disposed supporting stand adaptable for connection to a vehicle in which the implement includes a boom swingable angularly about one end and has earth working equipment at the opposite end, the improvement residing in: transverse structure on the stand facing the implement; structure mounted on and adjacent said one end of the boom, said latter structure being engageable with the transverse structure on the stand so as to permit positioning of the boom in any of a plurality of transverse positions on the transverse structure; a supporting structure mounted on the vehicle and including therein elements engageable with the stand; means mounting the stand on the elements, said means being adapted to permit transverse movement of the stand relative to the vehicle; and power means effective to move said implement transversely relative to the stand and said stand transversely relative to its supporting structure to effect transverse positioning of the implement and stand relative to the stand and vehicle respectively.

6. In a combination of implement and vertically disposed supporting stand adaptable for connection to a vehicle in which the implement includes a boom swingable angularly about one end and has earth working equipment at the opposite end, the improvement residing in: transverse structure on the stand facing the implement; structure mounted on and adjacent said one end of the boom, said latter structure being engageable with the transverse structure on the stand so as to permit positioning of the boom in any of a plurality of transverse positions on the transverse structure; a supporting structure mounted on the vehicle and including therein elements engageable with the stand; means mounting the stand on the elements, said means being adapted to permit transverse movement of the stand relative to the vehicle; and means adaptable to lock the boom in any of a plurality of transverse positions relative to the stand; means adaptable to lock the stand in any of a plurality of transverse positions relative to the supporting structure.

7. In a combination of implement and vertically disposed supporting stand adaptable for connection to a vehicle in which the implement includes a boom swingable angularly about one end and has earth working equipment at the opposite end, the improvement residing in: transverse structure on the stand facing the implement; structure mounted on and adjacent said one end of the boom, said latter structure being engageable with the transverse structure on the stand so as to permit positioning of the boom in any of a plurality of transverse positions on the transverse structure; a supporting structure mounted on the vehicle and including therein elements engageable with the stand; means mounting the stand on the elements, said means being adapted to permit transverse movement of the stand relative to the vehicle.

8. In a combination of implement and supporting stand in which the implement includes a boom structure mounted on the stand and has earth working equipment mounted thereon; and the stand includes therein retractible leg supports, the improvement residing in: upper and lower continuous transverse track members supported on the stand and facing the vehicle; a supporting structure mounted on the vehicle and including therein guide elements complementary to and engageable with the track members effective to permit transverse movement of the stand relative to the vehicle; means adaptable to lock the stand in any of a plurality of positions relative to the supporting structure; and power means effective to move said stand transversely relative to its supporting structure along the track members to effect transverse positioning of the stand relative to the vehicle.

9. In a combination of implement and vertically disposed supporting stand in which the implement includes a boom structure mounted on the stand and has earth working equipment mounted thereon; and the stand includes therein retractible leg supports, the improvement residing in: transverse track means supported on the stand; a supporting structure mounted on the vehicle and including therein guide elements complementary to and engageable with the track means effective to permit transverse movement of the stand relative to the vehicle; means adaptable to lock the stand in any of a plurality of positions relative to the supporting structure; and power means effective to move said stand transversely relative to its supporting structure along the track means to effect transverse positioning of the stand relative to the vehicle.

10. In a combination of implement and vertically disposed supporting stand in which the implement includes a boom structure mounted on the stand and has earth working equipment mounted thereon; and the stand includes therein retractible leg supports, the improvement residing in: transverse track means supported on the stand; a supporting structure mounted on the vehicle and including therein guide elements complementary to and engageable with the track means effective to permit transverse movement of the stand relative to the vehicle; and power means effective to move said stand transversely relative to its supporting structure along the track means to effect transverse positioning of the stand relative to the vehicle.

11. The invention defined in claim 10 in which the earth working equipment is in the form of earth digging equipment swingable on one end of the boom structure and the said power means is a hydraulic unit which operates to swing the digging equipment on the boom, said hydraulic unit operating to move the stand transversely by operating the digging equipment against a relatively immovable object thereby forcing relative movement between the track means and the guide elements.

12. In a combination of a mobile vehicle and implement in which the implement includes a boom structure swingable angularly both laterally and vertically about one end and having earth working equipment at the opposite end, and power means for swinging the boom angularly and operating the earth working equipment, the improvement comprising: an upright supporting stand between the vehicle and implement with opposite sides facing the implement and vehicle respectively; means on the side of the stand facing the vehicle mounting the stand on the vehicle; retractable ground supports on the stand; transverse track and guide means extending between the side of the stand facing the implement and the boom structure effective to premit transverse movement of the boom structure relative to the stand; means adaptable to lock the boom structure in any of a plurality of transverse positions relative to the stand and whereby upon the boom structure not being locked to the stand the power means is effective to move the implement transversely relative to the stand.

13. In a combination of a mobile vehicle and implement in which the implement includes a boom structure swingable angularly both laterally and vertically about one end and having earth working equipment at the opposite end, and power means for swinging the boom angularly and operating the earth working equipment, the improvement comprising: an upright supporting stand between the vehicle and implement with opposite sides facing the implement and vehicle respectively; means on the side of the stand facing the vehicle mounting the stand on the vehicle; retractable ground supports on the stand; transverse track and guide means between the side of the stand facing the implement and the boom structure effective to permit transverse movement of the boom structure relative to the stand; and means adaptable to lock the boom structure in any of a plurality of transverse positions relative to the stand whereby upon the boom structure not being locked to the stand the power means may be utilized to move the boom transversely relative to the stand.

14. The invention defined in claim 13 in which the means locking the boom structure is in the form of a plurality of transversely spaced apart openings in the track means and the guide means is provided with a pin member adapted to fit in one of said openings to prevent transverse movement between the stand and boom structure.

15. The invention defined in claim 13 in which the means locking the boom structure is in the form of a lock element frictionally engageable between said track and guide elements to prevent relative movement therebetween at an infinite number of transverse positions, and control means for effecting the frictional engagement of said lock element.

16. A supporting stand between a forwardly movable vehicle and an implement which includes a boom structure swingably angularly about one end and having earth working equipment at the opposite end, comprising: transverse and upright frame structure; a pair of ground supporting legs at opposite ends of the frame structure; means for retracting the supporting legs; first and second transverse track members mounted on opposite sides of the frame structure; a guide element mounted on and complementary to one of the track members for transverse movement relative thereto; means connecting said guide element to said one end of the boom structure for affording support for the boom structure; a supporting structure adapted for mounting on the vehicle and including therein a guide element complementary to and engageable with the other of the track members and effective to permit transverse movement of the stand relative to the vehicle; means adaptable to lock the boom structure in any of a plurality of transverse positions relative to the frame structure; means adaptable to lock the frame structure in any of a plurality of transverse positions relative to the supporting structure; and power means effective to move said implement relative to the frame structure and along said one of the track members and said frame structure relative to its supporting structure along said other of the track members to effect transverse positioning of the implement and stand relative to the stand and vehicle respectively.

17. The invention defined in claim 16 further characterized by said guide elements being adapted to fit on either of said first and second transverse track members whereby said implement and vehicle may be positioned on either opposite or the same sides of the frame structure.

18. A supporting stand between a forwardly movable vehicle and an implement which includes a boom structure swingably angularly about one end connected to the supporting stand and having earth working equipment at the opposite end, comprising: transverse and upright frame structure; a pair of ground supporting legs at opposite ends of the frame structure; means for retracting the supporting legs; a transverse track member supported on the frame structure; a supporting structure adapted for mounting on the vehicle and including therein a guide element complementary to and engageable with the track member effective to permit transverse movement of the stand relative to the vehicle; and power means effective to move said frame structure relative to its supporting structure along its track to effect transverse positioning of the implement relative to the vehicle, said power means including a hydraulic cylinder transversely disposed between the frame structure and vehicle and effective to provide reciprocating transverse movement of the frame structure relative to the vehicle.

19. An earth-working vehicle comprising, in combination, a pair of ground-engaging wheels at one end of said vehicle, a transverse frame mounted outboard of said wheels, said frame having spaced vertical surfaces running transversely, one above the other, from the outward side of one of said wheels to the outward side of the other of said wheels, said frame further having horizontally spaced locking cavities at the ends, center and points in between the ends and center of the vertical surfaces, a bracket having spaced flat mounting surfaces, said frame and said bracket carrying means holding said bracket mounting surfaces in engagement with said frame vertical surfaces so as to mount the bracket on the vehicle for transverse movement, said bracket having adjustable locking elements supported thereon complementary to the locking cavities on the frame, a shovel-supporting assembly including a boom pivoted on said bracket for horizontal swinging movement, a shovel pivotally carried on said boom, a hydraulic motor on said bracket for horizontally swinging said boom, said boom also being pivoted relative to said bracket for vertical swinging movement, a hydraulic motor anchored to said assembly for vertically swinging said boom, said assembly including hydraulic motors for moving said shovel toward and away from said bracket, and said holding means permitting adjustment of said bracket along said transversely running frame surfaces under the power of an appropriate one of said hydraulic motors to align the locking elements with at least one of the locking cavities whereby the locking elements may be adjusted to rigidify the bracket with the frame and positively prevent incidental movement therebetween.

20. An earth-working vehicle comprising, in combination, a pair of ground-engaging wheels at one end of said vehicle, a transverse frame mounted outboard of said wheels, said frame having spaced vertical surfaces running transversely, one above the other, from the outward side of one of said wheels to the outward side of the other of said wheels, a bracket having spaced mounting surfaces, said frame and said bracket carrying means holding said bracket mounting surfaces in abutting engagement with said frame vertical surfaces so as to mount the bracket on the vehicle for transverse movement, a wedging element carried on the bracket and engageable with a surface on the frame, an element control means carried on the bracket for selectively wedging the element against the surface to lock the bracket against transverse movement, a shovel-supporting assembly including a boom pivoted on said bracket for horizontal swinging movement, a shovel pivotally carried on said boom, a hydraulic motor on said bracket for horizontally swinging said boom, said boom also being pivoted relative to said bracket for vertical swinging movement, a hydraulic motor anchored to said assembly for vertically swinging said boom, said assembly including hydraulic motors for moving said shovel toward and away from said bracket, and said holding means permitting adjustment of said bracket along said transversely running frame surfaces under the power of an appropriate one of said hydraulic motors.

21. The invention defined in claim 20 in which the wedging element is a plate eccentrically mounted on the bracket with a portion thereof adapted for engagement with the surface on the frame, and the control means is a lever associated with the plate for effecting engagement of the portion with the surface.

22. A method of transversely repositioning a backhoe along an upright transverse support comprising: providing a transverse guide means across an upright face of the support; supporting the backhoe on the guide means for transverse movement; swinging the backhoe to one side whereby the bucket thereon shall be transversely offset from the support; operating the hydraulic cylinders of the backhoe to place the bucket against a comparatively immovable object; operating the hydraulic cylinders of the backhoe to place the bucket against a comparatively immovable object; operating the hydraulic cylinders of the backhoe so as to shift the backhoe along the guide means to a desirable transverse location along the guide means; and locking the backhoe to the support so as to positively prevent movement of the backhoe from the location.

23. A method of transversely repositioning a backhoe along an upright transverse support comprising: providing a transverse guide means across an upright face of the support; supporting the backhoe on the guide means for transverse movement; swinging the backhoe to one side whereby the bucket thereon shall be transversely offset from the support; operating the hydraulic cylinders of the backhoe to place the bucket against a comparatively immovable object; operating the hydraulic cylinders of the backhoe so as to shift the backhoe along the guide means to a desirable transverse location along the guide means; and wedging an element between the support and a portion of the backhoe adjacent the support to thereby lock the backhoe against movement relative to the support so as to positively prevent movement of the backhoe from the location.

References Cited in the file of this patent

UNITED STATES PATENTS

| | | |
|---|---|---|
| 2,292,870 | Dixon | Aug. 11, 1942 |
| 2,764,306 | Dorkins | Sept. 25, 1956 |
| 2,785,813 | Tofflemire | Mar. 19, 1957 |
| 2,792,953 | King | May 21, 1957 |
| 2,822,101 | Schenkelberger | Feb. 4, 1958 |
| 2,828,880 | Perry | Apr. 1, 1958 |
| 2,834,489 | Davis | May 13, 1958 |

FOREIGN PATENTS

| | | |
|---|---|---|
| 648,543 | Great Britain | Jan. 10, 1951 |
| 1,038,163 | France | May 6, 1953 |

UNITED STATES PATENT OFFICE
CERTIFICATE OF CORRECTION

Patent No. 3,155,250                                      November 3, 1964

John L. French et al.

It is hereby certified that error appears in the above numbered patent requiring correction and that the said Letters Patent should read as corrected below.

Column 9, line 43, for "vertical" read -- vertically --; column 11, line 39, for "premit" read -- permit --; column 12, lines 7 and 40, for "swingably", each occurrence, read -- swingable --; column 14, lines 9 to 11, strike out "operating the hydraulic cylinders of the backhoe to place the bucket against a comparatively immovable object;".

Signed and sealed this 30th day of March 1965.

(SEAL)
Attest:

ERNEST W. SWIDER                                      EDWARD J. BRENNER
Attesting Officer                                            Commissioner of Patents